INVENTORS
THEODORE R. TOUW
CASPER B. SWANEY
BRUCE C. ATWOOD

BY Joseph L. Spiegel
ATTORNEY

United States Patent Office 3,453,727

Patented July 8, 1969

3,453,727
FABRICATION OF RESISTORS

Theodore R. Touw, Syracuse, and Casper B. Swaney, Poughkeepsie, N.Y., and Bruce C. Atwood, Westport, Conn., assignors to International Business Machines Corporation, Armonk, N.Y., a corporation of New York Filed Aug. 18, 1966, Ser. No. 573,270
Int. Cl. H01c *7/00, 17/00*
U.S. Cl. 29—620 5 Claims

ABSTRACT OF THE DISCLOSURE

The method of fabricating a resistor from a resistive film of a semiconductor material with a silver or silver alloy additive includes the step of subjecting the film to a high intensity electric field by passing an electrical pulse therethrough of predetermined duration and magnitude so as to reduce the bulk resistivity of the film without producing an accompanying thermal effect.

This invention relates to fabrication of resistors, and in particular to the fabrication of microelectronic resistors with uniform, stable resistance characteristics, such as are required in information handling systems, i.e., computers and the like.

In the field of microelectronic circuitry, and in particular hybrid circuitry, resistors are formed on the insulating substrate of a microminiature module by preparing the substrate for graphic arts processing, printing on the surface of the substrate a unique metallic topology, firing the substrate at a preselected temperature to establish a conductive land pattern thereon, printing a resistive paste on the substrate at discrete locations in the land pattern, and firing at a preselected temperature and time to form a resistive layer thereon. The screened layer of resistive material is initially made to be larger in width than required and the resistive value is adjusted upwardly to a predetermined value by removing a portion of the material. This method is discussed in more detail in a copending application of Edward M. Davis, Jr. et al., entitled "Functional Components," Ser. No. 300,734, filed Aug 8, 1963, and assigned to the same assignee as the present invention. Suitable resistor materials are disclosed in U.S. Patent 2,924,540 to D'Andrea, issued Feb. 9, 1960; U.S. Patent 3,052,573 to Dumesnil, issued Sept. 4, 1962; U.S. Patent 3,248,345 to Mones et al., issued Apr. 26, 1966; and 8 IBM Technical Disclosure Bulletin, No. 7, p. 942 (December 1965) by Touw. A feasible resistor trimming apparatus is described in more detail in 4 IBM Technical Disclosure Bulletin No. 9, pp. 15–16 (February 1962).

The prior art method of fabricating resistors discussed briefly above, even though in extensive use today, is not without certain disadvantages. First of all, it has been discovered that when objects or tools used in the fabrication process or when personnel or objects in a computer room become charged by static electrification, if the discharge goes through the resistor, such discharge can permanently change the resistance of such resistors.

A second disadvantage is that in the prior art method, the initial value of the screened resistor must always be less than the final desired value, since adjustment can only be made upwards by removal of material. If, for example, the initial values were greater than the final desired values, the module of which the resistor forms a part would have to be discarded.

Accordingly, one object of the present invention is a method of fabricating resistors so as to stabilize them with uniform resistance characteristics.

Another object is tailoring resistors by adjusting the bulk resistivity of the resistor without varying the geometry of the resistor, allowing smaller sized resistors to be used.

Still another object is fabricating resistors using an electrical pulse without producing an accompanying thermal effect.

These and other objects are accomplished in accordance with the present invention, one illustrative embodiment of which comprises forming on a dielectric substrate a resistive film of a semiconductor material with a silver or silver alloy additive, for example, of the type disclosed in the above referred to D'Andrea, Dumesmil or Mones et al. patents and Touw article, and subjecting said film to a high intensity electric field by passing an electrical pulse therethrough.

It is known, in the prior art, to pass a current through a resistor during its fabrication.

Thus, a current is passed through the resistive material for curing the resistive material. Typical examples are disclosed in U.S. Patents 1,099,071 and 1,422,130.

In other cases the value or characteristic of a resistor is adjusted to a desired value by passing a current therethrough as by discharging a pulse through the resistor of sufficient time and magnitude to raise the temperature of the resistor, the effect of which is to thermally alter the resistor until the desired value or characteristic is achieved. Typical examples are disclosed in U.S. Patents 1,835,267, 1,887,380, 1,906,853, 2,613,302, 2,707,223, 2,951,817, 2,994,847, 3,124,772, 3,261,082 and a copending application of R. L. Bullard et al. entitled, "Fabrication of Cermet Film Resistors," Ser. No. 321,928, assigned to the same assignee as the present invention now U.S. Patent 3,308,528, issued Mar. 14, 1967.

In still others a current is passed through the resistor while its value is adjusted by some other means, as by grinding, abrasion, compression, anodization, etc. In these situations the current primarily serves a monitoring function. Typical examples are disclosed in U.S. Patents 2,500,605, 2,799,051, 3,148,129, 3,162,932 and 3,170,966.

The present invention is distinguishable over such prior art techniques in that the value or characteristic of the resistor subjected to the electrical pulse is altered to a predetermined value by the fields so produced and not by the accompanying thermal effect, as is required in prior techniques. That is, in the prior art the value or characteristics of the resistor are varied by the heating of the resistor or a portion thereof to a temperature above its normal operating temperature as a result of the current passing therethrough. Previous attempts to produce resistance changes by purely electrical means through an accompanying thermal effect resulted in only small changes or in uncontrolled burn-outs. In the present invention, heating, if any, is negligible. The present method is practiced by using impulses of such duration and magnitude as to be insufficient to add enough energy to heat up the resistor, the pulse typically being on the order of 0.20–0.90 microsecond, and upwards to 32 volts per mil.

In one application of the novel technique, the sensitivity of resistors to accidental electrical discharge is reduced by purposely subjecting them to pulses of at least $10^{-4}$ joules and whose initial voltage is such as to produce a field of approximately 25 kv./in. across the resistor. Thereafter, the resistor is tailored by normal methods, as abrasive removal. Resistors stabilized in this manner are much less sensitive to subsequent accidental static electrical discharge.

In another application, the resistance of a resistor is modified by subjecting the resistor to an electrical pulse which varies its bulk resistivity to a predetermined value. The procedure may be carried out by connecting the resistor by use of its own terminals into suitable circuitry. A particular advantage results from the fact that the pulse lowers resistivity. By so tailoring, extra room is not required to be left on the module, as required in mechanical trimming methods. All resistors need not be parallel to each other as is required for automated mechanical trimming. Since pulse trimming reduces resistance, resistors can intially be made of smaller size (higher value) thus requiring less material and leaving more room on the module substrate for other circuit elements. There is no damage to the resistors or to the substrate on which it is formed.

The exact operating principle is not completely understood. However, the following theory is postulated.

A resistor to which the present invention is applicable consists essentially of a mixture of a semiconductor, silver or silver alloy and glass. The resistivity of this mixture is determined predominantly by the resistivity of the semiconductor. It is known, however, that resistivity changes are clearly attributable to the effects of doping. The dopant enters the semiconductor lattice and adjusts the resistivity in proportion to the amount of dopant added. Palladium oxide, for example, is a metal-deficit (P-type) semiconductor, which may be doped upwards or downwards in resistivity by substitution of trivalent or monovalent cation, respectively, in place of palladium ions.

Experiments have suggested that the monovalent silver ion dopes palladium oxide in this way, producing one carrier (hole) per silver ion. The present model assumes that the observed change in resistivity occurs when the electric field involved in a discharge pulls silver ions out of palladium oxide crystal lattice. When a silver ion is removed from the palladium oxide, it leaves a cation vacancy. Each cation vacancy requires two holes to preserve the neutrality of the oxide, i.e., one more current carrier than the silver ion produced. Thus, each silver ion removed would increase the carrier concentration by one, decreasing the resistivity of the semiconductor. The silver thus removed could also contribute to lower resistance of the mixture by providing shunt paths around parts of the semiconductor and glass.

The foregoing and other objects, features and advantages of the present invention will be apparent from the following more particular description of the preferred embodiments of the invention, as illustrated in the accompanying drawings, wherein.

Figure 1:
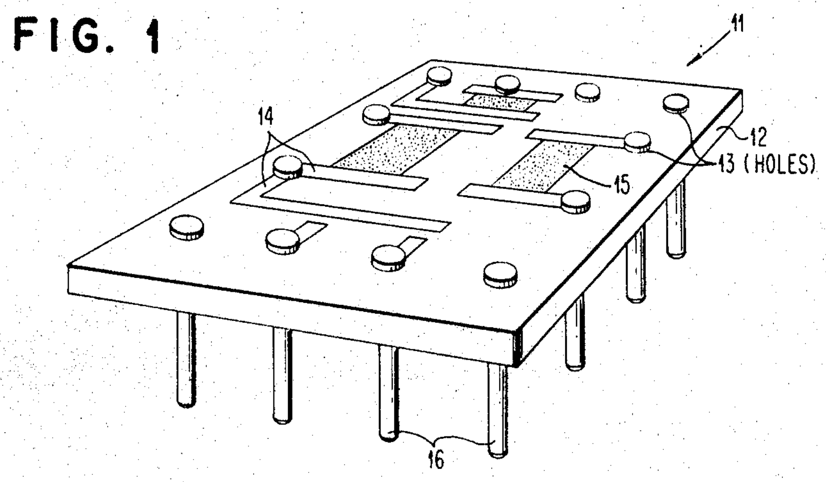
FIGURE 1 is a perspective view of a resistor pattern on a dielectric substrate.

Referring now to FIGURE 1, there is disclosed a microminiature module 11 including a supporting dielectric substrate 12. The substrate can be composed of any of the common insulating materials such as 96% alumina ceramic and is the order of 0.45" x 0.45" x 0.06" thick. A plurality of pin terminal holes 13 are formed about the periphery.

Prior to printing a unique metallic circuit topology 14 on the top of substrate 12, the substrate is cleaned by immersion in trichloroethylene. The immersed substrate is placed in an ultrasonic cleaner for approximately five minutes. Upon removal, substrates are dried in warm air for approximately fifteen minutes.

After cleaning, the unique metallic circuit topology 14 is printed. Metallizing inks, typically compositions of gold, silver and platinum, are employed in the printing process. The ink must have excellent adhesion properties to the substrate, as well as provide good electrical conductivity and soldering characteristics. The printing on the substrates is done by a conventional silk screening process. After formation of the unique circuit topology, the substrate is fired in a conventional oven at approximately 750–800° C. for a period of approximately thirty minutes. The final solidified conductors are approximately 5 to 10 mils in width and may be separated by an equal distance.

The resistor elements 15 to which the present invention is applicable are next printed on the substrate. A conventional silk screen process is also employed to print the resistors. The resistors are normally printed between parallel disposed portions of the conductive pattern 14.

After fixedly positioning pins 16 within the holes, a tinning operation may be performed to assure good electrical connection between pins and pattern and reduce the series resistance of the pattern. The solder so provided is used for subsequent joining of active elements.

Figure 2:
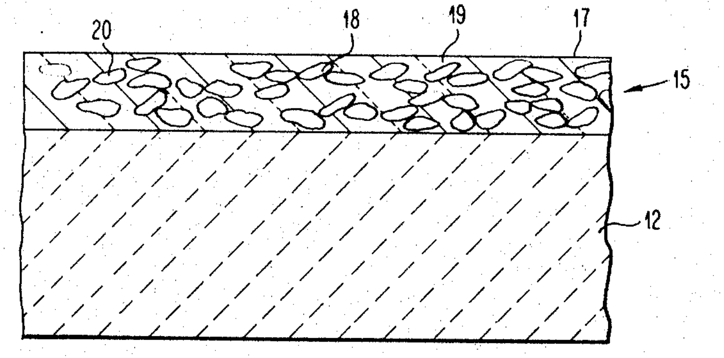
FIGURE 2 is an enlarged cross sectional view of a portion of an electrical resistance element of FIGURE 1 to which the present invention is applicable.

FIGURE 2 is a cross sectional view of one of the resistor elements 15 of FIGURE 1. The element is formed by applying a thin layer 17 of a particular resistance composition to the ceramic substrate and firing. The resistance composition comprises a doped or undoped semiconductor material 18, parts of finely divided glass which upon firing bond together to form a glassy matrix 19, and in addition finely divided silver metal 20.

Figure 3:
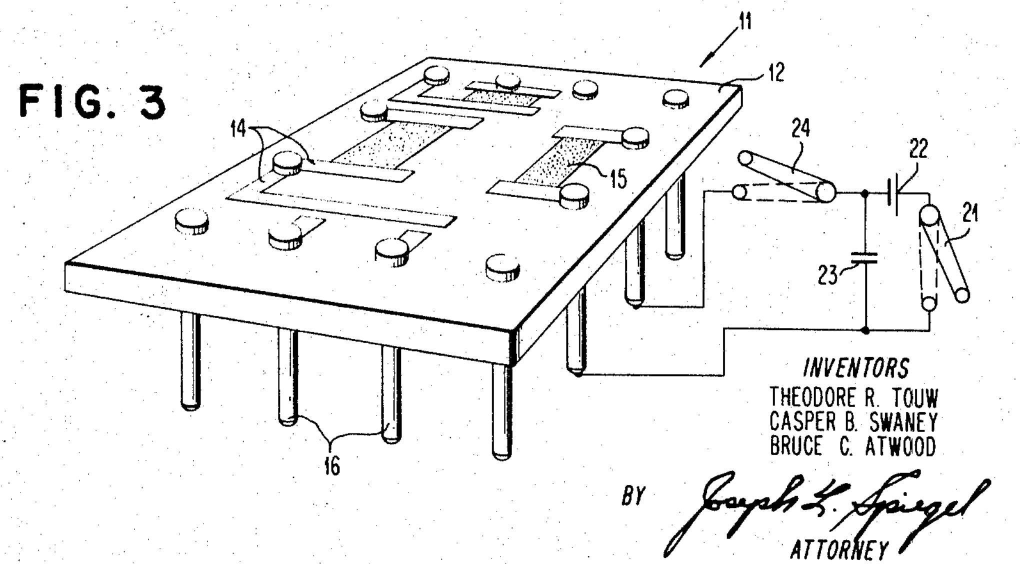
FIGURE 3 is an enlarged view of the module of FIGURE 1 with the accompanying fabrication circuitry shown in electrical schematic.

FIGURE 3 illustrates the module 11 of FIGURE 1 with the accompanying fabrication circuitry. Included is an energizing circuit comprising a first switch 21, DC source 22 and high voltage capacitor 23, and a pulse circuit comprising the capacitor 23, a second switch 24 and one of the resistors 15 on the module, which is connected in the pulse circuit through a pair of the module pins. Alternatively, the resistor can be connected in the pulse circuit directly through a pair of probes connected across the resistor.

Operation is as follows: with switch 24 open, switch 21 is closed until capacitor 23 is charged to a desired value. Switch 21 is now opened leaving the capacitor 23 in its charged state to be thereafter discharged through the resistor 15. With switch 21 open, switch 24 is closed to discharge the capacitor 23 through the resistor 15 via the pin terminals. Although mechanical switches are illustrated, it is apparent that electronic switching elements may be employed.

Figure 4:
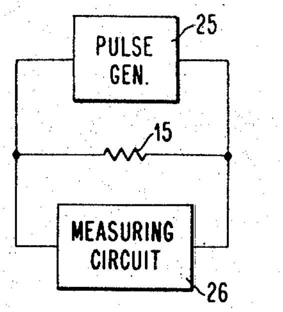
FIGURE 4 is a block diagram of another embodiment of the present invention.

FIGURE 4 discloses a block diagram of another embodiment of the present invention including a conventional pulse generator 25 for discharging a train of pulses through a resistor 15 under trim and a measuring circuit 26 such as a Wheatstone bridge which has the resistor 15 under trim as the unknown arm and the desired value of the resistor as the standard arm.

In general the extent of trimming is dependent on the pulse duration or width, pulse amplitude and pulse rate, and the properties of the resistor.

With regard to pulse width, the present invention is practiced by using impulses of short duration compared to the thermal time constant of the resistor being trimmed. For resistors having thermal time constants of from 1–100 seconds, say 17 seconds, pulse widths of from 0.20–0.90 microseconds are typical values. It also appears that the amount of maximum possible trim is dependent on pulse width, the amount of maximum possible trim being inversely proportional to pulse width.

Experiments with multiple pulses show that the amount of change in resistance falls off rapidly with the number of discharges. By increasing the pulse amplitude in small increments, the resistance decreases in small increments, until a point is reached at which further increase in amplitude results in increase in resistance. The increase is attributable to undesired thermal action caused by overloading the resistor by the application of enough energy to raise the temperature of the resistor.

A typical pulse rate is approximately 20 pulses per second. The pulse rate may vary over a wide range but should not be so high as to give rise to a nonnegligible heating effect which in turn would cause an increase in resistance and possible eventual resistor burn-out.

STABILIZING

In the stabilizing application, the resistor is subjected to a discharge before tailoring the resistors by the normal method, i.e. abrasive removal of resistive material. The following example demonstrates the effectiveness of this method.

Example I

Two sets of modules were made by the normal process, and one resistor on each module was subjected to a discharge energy of $5.6\times10^{-4}$ joules with an initial electric field of 25 kv./in. Thereafter, each resistor on all modules was tailored by abrasive removal to the same value of 3.6 k-ohms/sq. Thereafter, each resistor on all the modules was subjected to a discharge of $5.6\times10^{-4}$ joules and initial electric field of 25 kv./in. (a discharge that can occur accidentally in practice). The following resistance changes occurred:

PERCENT $\Delta$R

| | Average | High | Low |
|---|---|---|---|
| Untreated | −59.4 | −61.6 | −56.9 |
| Stabilized | +.02 | +13.4 | −11.0 |

The results indicate that untreated resistors are far less stable in the presence of accidental electrical discharges.

TRIMMING

In its other application, the method of the present invention is practiced by discharging a pulse through the resistor to produce a high enough field to lower its bulk resistivity to a predetermined value.

Thereafter the resistors may be subjected to a high temperature bake, e.g., at 150° C. for about 24 hours to produce a resistor of somewhat better thermal stability than results from merely discharging a pulse through the resistor. This latter step is not required where the resistors are to be used at normal operating temperatures of 25 to 75° C. The following examples demonstrate the effectiveness of this trimming method.

Example II

Figure 5A:
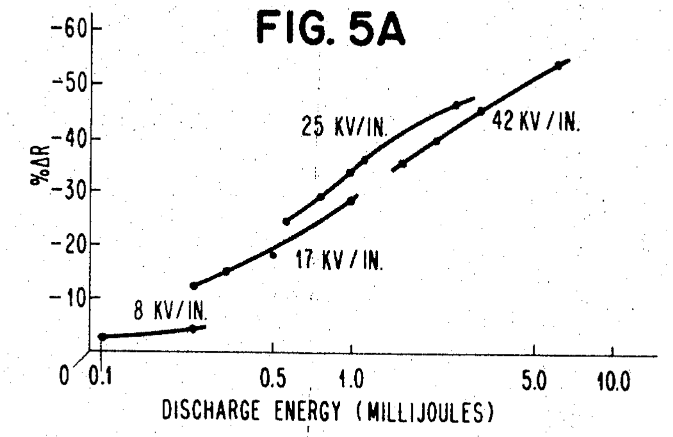
FIGURES 5A and 5B are sets of curves representing resistance change vs. discharge parameters for single pulse operation.
Figure 5B:
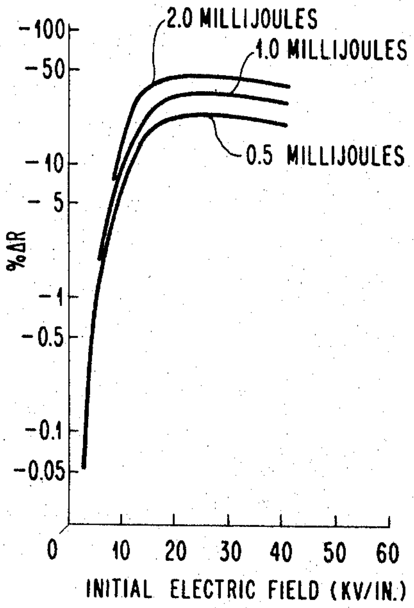

In a series of experiments, the dependence of resistance change on discharge parameters was investigated. The resistive materials used in these experiments were blends of silver containing Du Pont resistor compositions #7827 and #7828. Typical results of these experiments are shown in FIGURES 5A and 5B. The apparatus of FIGURE 3 was used to discharge single pulses through the resistors.

FIGURE 5A is a plot of resistance change vs. discharge energy for various initial electric fields. The curves indicate that the percentage of trimming by this method increases with increasing pulse energy.

FIGURE 5B is a plot of resistance change vs. initial field at various discharge energies. The decreased resistance change at the highest fields is caused by arcing within the resistor which partly offsets the decrease in resistance with a small local increase due to local heating.

Example III

As a general rule pulse trimming is carried out under ambient conditions. However, due to the high fields associated with pulse trimming, it is sometimes necessary to trim the resistors in a medium which would prevent arcing. Suitable materials are trichloroethylene and mineral oil. Trichloroethylene was found to be sufficient protection for trimming resistors with lengths up to 60 mils. However, mineral oil was chosen for its higher dielectric strength and the greater protection for dense modules when many closely spaced lands appear. The oil is easily removable in trichloroethylene. In the following experiments such fluid mediums were used to prevent arcing.

In a series of experiments, the dependence of resistance change on pulse parameters was investigated. The resistive materials used in these experiments were blends of silver containing Du Pont resistor compositions #7827 and #7828. The apparatus of FIGURE 4 was used to discharge a train of pulses through the resistors under trim. Typical results of these experiments are shown in FIGURE 6A.

Figure 6A:
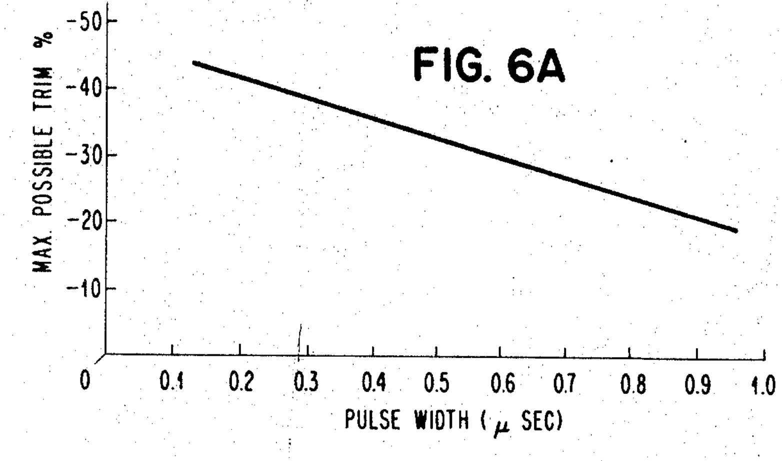
FIGURES 6A and 6B are sets of curves representing resistance change vs. pulse parameters for pulse train operation.

FIGURE 6A is a plot of resistance change vs. pulse width at a pulse rate of approximately twenty pulses per second. Results indicate that maximum possible trim is inversely proportional to pulse width.

Figure 6B:
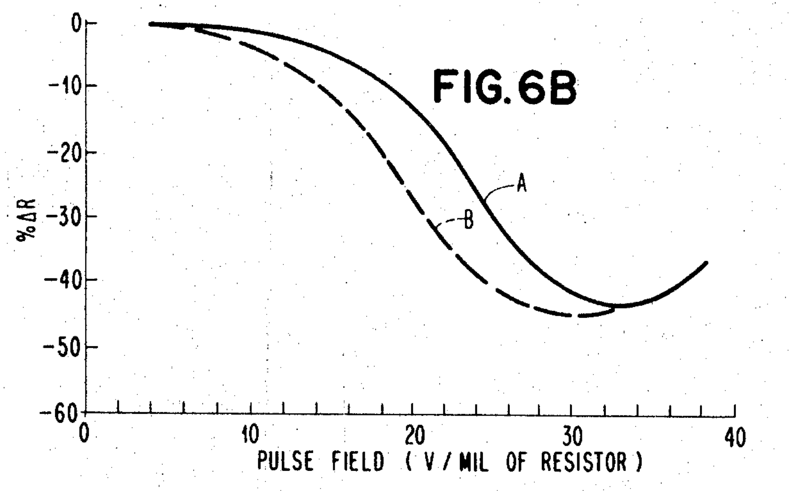

FIGURE 6B is a plot of resistance change vs. pulse amplitude, for two different paste compositions Du Pont #7827 (curve A) and Du Pont #7828 (curve B). Pulse width was fixed at 0.22 microseconds and the pulse amplitude was increased in small increments of 0.5 volt per mil per pulse. The results indicate that increasing the pulse amplitude in small increments decreases the resistance in small increments. The results also show an increase in resistance with further increase in amplitude at approximately 32 volts per mil in the case of curve A and 30 volts per mil in the case of curve B. The increase is attributable to undesired thermal action caused by thermally overloading the resistor by the continual application of higher fields and total energy. The increase is accomplished by a considerable amount of arcing and if carried to the extreme, the resistor opens or burns out.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In the method of fabricating a resistor from a resistive film of a semiconductor material with a silver or silver alloy additive, the step of:

subjecting said film to a high intensity electric field by passing an electrical pulse therethrough of predetermined duration and magnitude so as to reduce the bulk resistivity of said film without producing an accompanying thermal effect.

2. The method according to claim 1 including the step of removing a portion of the film through which a discharge previously has been passed.

3. The method according to claim 1 including the step of subjecting the film through which a pulse previously has been passed, to an environment having an elevated temperature to stabilize the resistive value thereof.

4. The method of trimming a resistor comprising a resistive film of semiconductor material with a silver or silver alloy additive, which includes the step of subjecting said film to a train of pulses of predetermined duration and energy so as to reduce the bulk resistivity of said film without producing an accompanying thermal effect, the amplitude of each successive pulse being greater than the amplitude of the previous pulse.

5. The method according to claim 1 wherein said film is subjected to said high intensity field within an arc inhibiting fluid medium.

References Cited

UNITED STATES PATENTS

| | | | |
|---|---|---|---|
| 2,994,847 | 8/1961 | Vodar | 338—308 |
| 3,261,082 | 7/1966 | Maissel et al. | |
| 3,308,528 | 3/1967 | Bullard et al. | |
| 3,371,411 | 3/1968 | Russell | 29—620 X |

JOHN F. CAMPBELL, *Primary Examiner.*

J. L. CLINE, *Assistant Examiner.*